US012284574B2

United States Patent
Gorur Manjunath et al.

(10) Patent No.: US 12,284,574 B2
(45) Date of Patent: Apr. 22, 2025

(54) METHOD AND SYSTEM FOR CONTROLLING SMS COMMUNICATION IN WIRELESS COMMUNICATION NETWORK

(71) Applicant: Samsung Electronics Co., Ltd., Suwon-si (KR)

(72) Inventors: Madhusudan Gorur Manjunath, Bengaluru (IN); Shanthossh Nagarajan, Bengaluru (IN); Kaja Mohaideen Mohamed Ali, Bengaluru (IN); Shouvik Guha, Bengaluru (IN); Sreenivasa Dhamaragunta Reddy, Bengaluru (IN); Rajendrababu Bandaru, Bengaluru (IN); Arijit Sen, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 17/851,589

(22) Filed: Jun. 28, 2022

(65) Prior Publication Data

US 2022/0329987 A1    Oct. 13, 2022

Related U.S. Application Data

(63) Continuation of application No. PCT/KR2022/005137, filed on Apr. 8, 2022.

(30) Foreign Application Priority Data

| Apr. 9, 2021 | (IN) | ............................. 202141016826 |
| May 13, 2021 | (IN) | ............................. 202141021696 |
| Feb. 2, 2022 | (IN) | ............................. 2021 41016826 |

(51) Int. Cl.
*H04W 4/12* (2009.01)
*H04L 5/00* (2006.01)
(Continued)

(52) U.S. Cl.
CPC ............. *H04W 4/12* (2013.01); *H04L 5/0053* (2013.01); *H04W 8/20* (2013.01); *H04W 68/005* (2013.01)

(58) Field of Classification Search
CPC ....... H04W 4/12; H04W 8/20; H04W 68/005; H04W 88/18; H04W 4/14; H04W 4/16;
(Continued)

(56) References Cited

U.S. PATENT DOCUMENTS

| 8,385,893 | B2 | 2/2013 | Gupta et al. |
| 9,712,452 | B2 | 7/2017 | Walke |

(Continued)

FOREIGN PATENT DOCUMENTS

| CN | 109151741 A | 1/2019 |
| KR | 10-2018-0080226 A | 7/2018 |

(Continued)

OTHER PUBLICATIONS

International Search Report dated Aug. 1, 2022, issued in International Application No. PCT/KR2022/005137.
(Continued)

*Primary Examiner* — Mohamed A Kamara
(74) *Attorney, Agent, or Firm* — Jefferson IP Law, LLP

(57) ABSTRACT

A method for controlling Short Message Service (SMS) communication by a Dual Subscriber Identity Module (SIM) Dual Standby (DSDS) device is provided. The method includes detecting that a first SIM is on a voice call and a second SIM is in a standby mode, determining whether page information is received at the second SIM from a server during the voice call of the first SIM and/or the voice call of the first SIM is terminated, immediately sending a refresh registration signal to the server or triggering an event at a DSDS device when the page information is received at the second SIM from the server during the voice call of the first
(Continued)

SIM and/or the voice call of the first SIM is terminated and immediately receiving a pending SMS from the server in response to sending the refresh registration signal to the server or triggering the event.

20 Claims, 12 Drawing Sheets

(51) Int. Cl.
*H04W 8/20* (2009.01)
*H04W 68/00* (2009.01)

(58) Field of Classification Search
CPC ..... H04W 68/10; H04W 60/00; H04W 88/06; H04W 8/18; H04L 5/0053; H04L 65/1016; H04L 65/1073
See application file for complete search history.

(56) References Cited

U.S. PATENT DOCUMENTS

| | | |
|---|---|---|
| 2016/0029204 A1 | 1/2016 | Lalwaney |
| 2016/0095157 A1 | 3/2016 | Wenzel et al. |
| 2017/0134298 A1 | 5/2017 | Walke |
| 2018/0098238 A1* | 4/2018 | Saxena ............ H04W 36/0066 |
| 2020/0245292 A1 | 7/2020 | Huang et al. |
| 2021/0014672 A1 | 1/2021 | Ponnamreddy et al. |
| 2021/0076440 A1 | 3/2021 | Qiu et al. |
| 2022/0053448 A1* | 2/2022 | Velev .................... H04W 8/183 |
| 2022/0086933 A1* | 3/2022 | Osterlund ............ H04W 8/183 |
| 2022/0240212 A1 | 7/2022 | Chun |

FOREIGN PATENT DOCUMENTS

| | | |
|---|---|---|
| WO | 2018/035334 A1 | 2/2018 |
| WO | 2020/247043 A1 | 12/2020 |
| WO | 2020/251293 A1 | 12/2020 |

OTHER PUBLICATIONS

Written Opinion dated Aug. 1, 2022, issued in International Application No. PCT/KR2022/005137.
Indian Examination Report dated Nov. 24, 2022, issued in Indian Application No. 202141016826.
3rd Generation Partnership Project; Technical Specification Group Services and System Aspects; Study on system enablers for devices having multiple Universal Subscriber Identity Modules (USIM) (Release 17), 3GPP TR 23.761 V1.3.0, XP 052000097, Mar. 23, 2021.
European Search Report dated Feb. 16, 2024, issued in European Application No. 22785025.2.
European Examination Report dated Mar. 6, 2025, issued in European Patent Application No. 22785025.2.

* cited by examiner

METHOD AND SYSTEM FOR CONTROLLING SMS COMMUNICATION IN WIRELESS COMMUNICATION NETWORK

CROSS-REFERENCE TO RELATED APPLICATION(S)

This application is a continuation application, claiming priority under § 365(c), of an International application No. PCT/KR2022/005137, filed on Apr. 8, 2022, which is based on and claims the benefit of an Indian Provisional patent application No. 202141016826, filed on Apr. 9, 2021, in the Indian Patent Office, of an Indian Provisional patent application No. 202141021696, filed on May 13, 2021, in the Indian Patent Office, and of an Indian Complete patent application No. 202141016826, filed on Feb. 2, 2022, in the Indian Patent Office, the disclosure of each of which is incorporated by reference herein in its entirety.

BACKGROUND

1. Field

The disclosure relates to a wireless communication network. More particularly, the disclosure relates to a method and a system for controlling Short Message Service (SMS) communication in the wireless communication network.

2. Description of the Related Art

In general, a User Equipment (UE) (e.g. mobile phone or smartphone) requires a Subscriber Identification Module (SIM) card to connect to a mobile network(s). The smartphone or mobile phone that can hold two different SIM cards at the same time is called a Dual SIM device. Since the Dual SIM device has two SIM cards, the Dual SIM device may utilize either of the two SIM cards to initiate or to receive phone call/Short Message Service (SMS)/internet service. In other words, Dual SIM is a feature of the smartphone that allows to simultaneously hold and utilize two different SIM cards. There are several types of Dual SIM implementations available. For example, Dual SIM Dual Active (DSDA) device and Dual SIM Dual Standby (DSDS) device.

The DSDA device allows a user to make phone calls from both of the SIM cards inside the smartphone. Furthermore, the DSDA device can also receive the calls on either of the two SIM cards, at the same time. The DSDA device has both their SIM cards permanently active and when the user is having a conversation on one of the SIM cards, the other SIM card still works and receives calls, messages, or data. For example, if the user has established a call on a first SIM card and receives another call on a second SIM card, the user will be notified about another call. The DSDA device has two radio transceivers, where each SIM card uses one radio transceiver. A disadvantage of the DSDA device is that the DSDA device consumes more batteries than regular single SIM smartphones due to using the two radio transceivers at a time. Further, the DSDA device is more expensive to manufacture, leading to a higher selling price which is reason for not finding the DSDA device in markets.

The DSDS device is a hybrid between a Dual SIM Standby device and the DSDA device. The DSDS device has two active SIM cards, and the DSDS device uses only one radio transceiver. In the DSDS device, both SIM cards are active only as long as the user is not using them, hence the name of Dual Standby. As long as the SIM cards are both in a standby mode, the user can make and receive the calls, the messages, or the data on any of them (i.e. SIM cards). However, once the user establishes the call on the first SIM card, then the second SIM card becomes inactive until the first SIM card is no longer actively used. The DSDS device consumes fewer batteries than the DSDA device, and the DSDS device is less expensive and more widespread in the markets.

But the DSDS device has some limitation(s), consider an example scenario illustrated in FIG. 1, when one of the SIM (e.g. the first SIM card/SIM-1 (10a)) is on the voice call, the other SIM (e.g. the second SIM card/SIM-2 (10b)) goes into the standby mode till the duration of the voice call. The standby mode has resulted in delayed reception of messages (e.g., SMS) which were sent to the SIM-2 (10b) while the SIM-1 (10a) is on the voice call. When the SIM-1 (10a) is on the voice call, an SMS delivery attempt to the SIM-2 (10b) was failed (e.g. SMS delivery retry #1 failed, SMS delivery retry #2 failed, etc.) and retried multiple times by a Short Message Service Centre (SMSC). The SMSC utilizes a retry timer (retry mechanism) is designed in a way that a time gap between retries would increase exponentially with the voice call duration on the SIM-1 (10a) i.e. based on several retries. As a result, if the duration of the voice call with the SIM-1 (10a) is longer, then the retry timer will get set with a longer expiry time. So, even the voice call of the SIM-1 (10a) was terminated, and the SIM-2 (10b) service will resume only after expiration of the retry timer when the SMSC triggers the SMS delivery retry.

FIG. 1 illustrates a problem in existing Short Message Service (SMS) delivery method(s), according to the related art.

For example, referring to FIG. 1, the voice call of the SIM-1 (10a) was terminated immediately after a 3rd retry of the SMSC (i.e. SMS delivery retry #3 failed), but the SMS will deliver to the SIM-2 (10b) only by a 4th retry of the SMSC (i.e. SMS delivery retry #4 success) which is based on the SMSC timer. The delay between the 3rd retry and the 4th retry is still observed even though the SIM-2 (10b) resumes the service and ready to receive any incoming call or SMS. As a result, the SMS delivery may get delayed (e.g. 1 minute to more than 10 minutes) even if the SIM-2 (10b) resumes the service and ready to receive any incoming call or SMS or data from the mobile network(s).

Furthermore, when one of the SIMs (e.g. SIM-1 (10a)) is on the voice call, the other SIM (e.g. SIM-2 (10b)) has limited connectivity or say out of synchronization with network entities (e.g. Evolved Universal Mobile Telecommunications System (UMTS) Terrestrial Radio Access Network (E-UTRAN) Node B (eNodeB), Next-Generation Node B (gNB), Mobility Management Entity (MME)), etc.). Due to the limited connectivity, the DSDS device has to face unexpected behavior like a break of services/service discontinuity on SIM-2 (10b) due to the DSDS device and the network entities being out of sync during the voice call on SIM-1 (10a). Even after the SIM-1 (10a)'s voice call ends, there might be a period until which the services could be disrupted or delayed owing to the out-of-sync state between the DSDS device and the network entities. This might result in a poor user experience such as calls not getting connected due to the MME of Long-Term Evolution (LTE)/an Access and Mobility Management Function (AMF) of 5th Generation New Radio (5G NR) being unable to track a correct location of the DSDS device and sent the SMS to SIM-2 (10b) being delivered late while the SIM-1 (10a) was in the voice call.

Thus, it is desired to provide a useful alternative for controlling SMS communication in a wireless communication network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to immediately send, by a Dual SIM Dual Standby (DSDS) device, a refresh registration signal to a server by detecting that page information is received at a second SIM from the server during a voice call of a first SIM and/or the voice call of the first SIM is terminated. The page information indicates that a pending SMS(es) is available at the server. The refresh registration signal indicates to update registration on the server (e.g. Voice over Long-Term Evolution (VoLTE) registration, Voice over New Radio (VoNR) registration, etc.) for the second SIM and indicates to stop an SMSC timer at the server. As a result, the DSDS device immediately receives the pending SMS(es) from the server and the server does not need to wait for the SMSC timer to expire for sending the pending SMS(es), which avoids delay in SMS delivery and enhances user's experience.

Another aspect of the disclosure is to immediately send, by the DSDS device, the refresh registration signal to the server by detecting that any page information is received at the second SIM from the server during the voice call of the first SIM and the voice call of the first SIM is terminated. As a result, the DSDS device sends the refresh registration signal to the server only when the page information is received at the second SIM from the server during the voice call of the first SIM, which decreases unnecessary signaling between the DSDS device and the server or in another word the DSDS device does not send the refresh registration signal to the server after each termination of the voice call, consumes less power.

Another aspect of the disclosure is to send the refresh registration signal with a reason header value (e.g. DSDS, service ready or some mutually agreed key string), so that the server does not have to check for an active SMSC timer for each refresh registration signal from the DSDS device.

Another aspect of the disclosure is to trigger an event on the second SIM by detecting that the voice call of the first SIM is terminated and/or the page information is received at the second SIM from the server during the voice call of the first SIM, a flag is set at the DSDS device. The flag is set at the DSDS device when the page information is received at the second SIM from the server during the voice call of the first SIM. The event includes an Internet Protocol (IP) Multimedia Subsystem (IMS) re-register procedure, a mobility update procedure, and a refresh IMS subscribe procedure. As a result, the DSDS device immediately receives the pending SMS(es) from the server, which avoids delay in the SMS delivery and enhances user's experience.

Additional aspects will be set forth in part in the description which follows and, in part, will be apparent from the description, or may be learned by practice of the presented embodiments.

In accordance with an aspect of the disclosure, a method for controlling Short Message Service (SMS) communication by a Dual SIM Dual Standby (DSDS) device in a wireless communication network, where the DSDS device includes a first Subscriber Identity Module (SIM) and a second SIM, is provided. The method includes detecting, by the DSDS device, that the first SIM is on a voice call and the second SIM is in a standby mode. Further, the method includes determining, by the DSDS device, whether page information is received at the second SIM from a server during the voice call of the first SIM, where the page information indicates that a pending SMS is available at the server. Further, the method includes determining, by the DSDS device, whether the voice call of the first SIM is terminated. Further, the method includes performing, by the DSDS device, one of, immediately sending a refresh registration signal to the server in response to determining that the page information is received at the second SIM from the server during the voice call of the first SIM and the voice call of the first SIM is terminated or immediately sending the refresh registration signal to the server in response to determining that the voice call of the first SIM is terminated. Further, the method includes immediately receiving, by the DSDS device, the pending SMS(es) from the server in response to sending the refresh registration signal to the server.

In an embodiment, the method includes sending, by the server, the page information to the second SIM during the voice call. Further, the method includes determining, by the server, whether an acknowledgement of the page information is received from the second SIM. Further, the method includes initiating, by the server, a Short Message Service Center (SMSC) timer in response to determining that the acknowledgement of the page information does not receive from the second SIM. Further, the method includes determining, by the server, whether the refresh registration signal is received from the second SIM. Further, the method includes terminating, by the server, the SMSC timer in response to determining that the refresh registration signal is received from the second SIM. Further, the method includes immediately sending, by the server, the pending SMS(es) to the second SIM associated with the page information.

In an embodiment, the server provides a service of IP Multimedia Subsystem (IMS) and a service of Short Message Service Center (SMSC).

In an embodiment, the refresh registration signal indicates to stop an SMSC timer at the server and immediately sends the pending SMS(es) associated with the page information to the second SIM.

In an embodiment, the refresh registration signal includes a reason header value, and where the reason header value includes a DSDS service ready, a DSDS service resume, and a mutually agreed key string.

In accordance with another aspect of the disclosure, a method for controlling the SMS communication by the server in the wireless communication network is provided. The method includes detecting, by the server, that the first SIM of the DSDS device is on the voice call and the second SIM is in the standby mode. Further, the method includes sending, by the server, the page information to the second SIM during the voice call of the first SIM, where the page information indicates that the pending SMS(es) is available at the server. Further, the method includes determining, by the server, whether the acknowledgement of the page information is received from the second SIM. Further, the method includes initiating, by the server, the SMSC timer in response to determining that the acknowledgement of the page information does not receive from the second SIM. Further, the method includes determining, by the server, whether the refresh registration signal is received from the second SIM. Further, the method includes terminating, by the server, the SMSC timer in response to determining that the refresh registration signal is received from the second SIM. Further, the method includes immediately sending, by the server, the pending SMS(es) to the second SIM associated with the page information.

In accordance with another aspect of the disclosure, a method for controlling the SMS communication by the DSDS device in the wireless communication network, where the DSDS device includes the first SIM and the second SIM, is provided. The method includes detecting, by the DSDS device, that the first SIM is on the voice call and the second SIM is in the standby mode. Further, the method includes determining, by the DSDS device, whether page information is received at the second SIM from the server during the voice call of the first SIM and a flag is set at the DSDS device, where the page information indicates that the pending SMS(es) is available at the server. Further, the method includes determining, by the DSDS device, whether the voice call of the first SIM is terminated. Further, the method includes performing, by the DSDS device, one of, triggering an event on the second SIM in response to determining that the page information is received at the second SIM from the server during the voice call of the first SIM, the flag is set at the DSDS device and the voice call of the first SIM is terminated or triggering the event on the second SIM in response to determining that the voice call of the first SIM is terminated. Further, the method includes immediately receiving, by the DSDS device, the pending SMS(es) from the server in response to triggering the event.

In an embodiment, the event includes an IP Multimedia Subsystem (IMS) re-register procedure, a mobility update procedure, and a refresh IMS subscribe procedure.

In an embodiment, the method includes determining, by the DSDS device, whether the second SIM is in a connected mode or the standby mode before establishing the voice call on the first SIM. Further, the method includes performing, by the DSDS device, one of, sending a suspend message to the server in response to determining that the second SIM is in the connected mode before establishing the voice call on the first SIM or sending the suspend message to the server by entering to the connected mode in response to determining that the second SIM is in the standby mode before establishing the voice call on the first SIM. Further, the method includes detecting that the voice call of the first SIM is terminated. Further, the method includes determining, by the DSDS device, whether the second SIM is in the connected mode or the standby mode when the voice call of the first SIM is terminated. Further, the method includes performing, by the DSDS device, one of, sending a resume message to the server in response to determining that the second SIM is in the connected mode, or sending the resume message to the server by entering into the connected mode in response to determining that the second SIM is in the standby mode.

In an embodiment, the suspend message indicates to maintain context information of the UE (e.g., TMSI, other identities shared during attach, connected mode security context, etc.) at the server, so that the NW and the UE can use the same context upon receiving back the transceiver from the other SIM module and the UE shall enter connected mode on the first SIM again.

In accordance with another aspect of the disclosure, a DSDS device for controlling the SMS communication in the wireless communication network is provided. The DSDS device includes a DSDS service controller coupled with a processor and a memory. The DSDS service controller detects that the first SIM is on the voice call and the second SIM is in the standby mode. Furthermore, the DSDS service controller determines whether page information is received at the second SIM from a server during the voice call of the first SIM, where the page information indicates that the pending SMS(es) is available at the server. Furthermore, the DSDS service controller determines whether the voice call of the first SIM is terminated. Furthermore, the DSDS service controller immediately sends the refresh registration signal to the server in response to determining that the page information is received at the second SIM from the server during the voice call of the first SIM and the voice call of the first SIM is terminated. Furthermore, the DSDS service controller immediately sends the refresh registration signal to the server in response to determining that the voice call of the first SIM is terminated. Furthermore, the DSDS service controller immediately receives the pending SMS(es) from the server in response to sending the refresh registration signal to the server.

In accordance with another aspect of the disclosure, a server for controlling the SMS communication in the wireless communication network is provided. The server includes a DSDS service controller coupled with a processor and a memory. The DSDS service controller detects that the first SIM of the DSDS device is on the voice call and the second SIM is in the standby mode. Furthermore, the DSDS service controller sends the page information to the second SIM during the voice call of the first SIM, where the page information indicates that the pending SMS(es) is available at the server. Furthermore, the DSDS service controller determines whether the acknowledgement of the page information is received from the second SIM. Furthermore, the DSDS service controller initiates the SMSC timer in response to determining that the acknowledgement of the page information is not received from the second SIM. Furthermore, the DSDS service controller determines whether the refresh registration signal is received from the second SIM. Furthermore, the DSDS service controller terminates the SMSC timer in response to determining that the refresh registration signal is received from the second SIM. Furthermore, the DSDS service controller immediately sends the pending SMS(es) to the second SIM associated with the page information.

In accordance with another aspect of the disclosure, a DSDS device for controlling the SMS communication in the wireless communication network is provided. The DSDS device includes a DSDS service controller coupled with a processor and a memory. The DSDS service controller detects that the first SIM is on the voice call and the second SIM is in the standby mode. Furthermore, the DSDS service controller determines whether page information is received at the second SIM from a server during the voice call of the first SIM and a flag is set at the DSDS device, where the page information indicates that the pending SMS(es) is available at the server. Furthermore, the DSDS service controller determines whether the voice call of the first SIM is terminated. Furthermore, the DSDS service controller triggers the event on the second SIM in response to determining that the page information is received at the second SIM from the server during the voice call of the first SIM, the flag is set at the DSDS device and the voice call of the first SIM is terminated. Furthermore, the DSDS service controller triggers the event on the second SIM in response to determining that the voice call of the first SIM is terminated. Furthermore, the DSDS service controller immediately receives the pending SMS(es) from the server in response to triggering the event.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
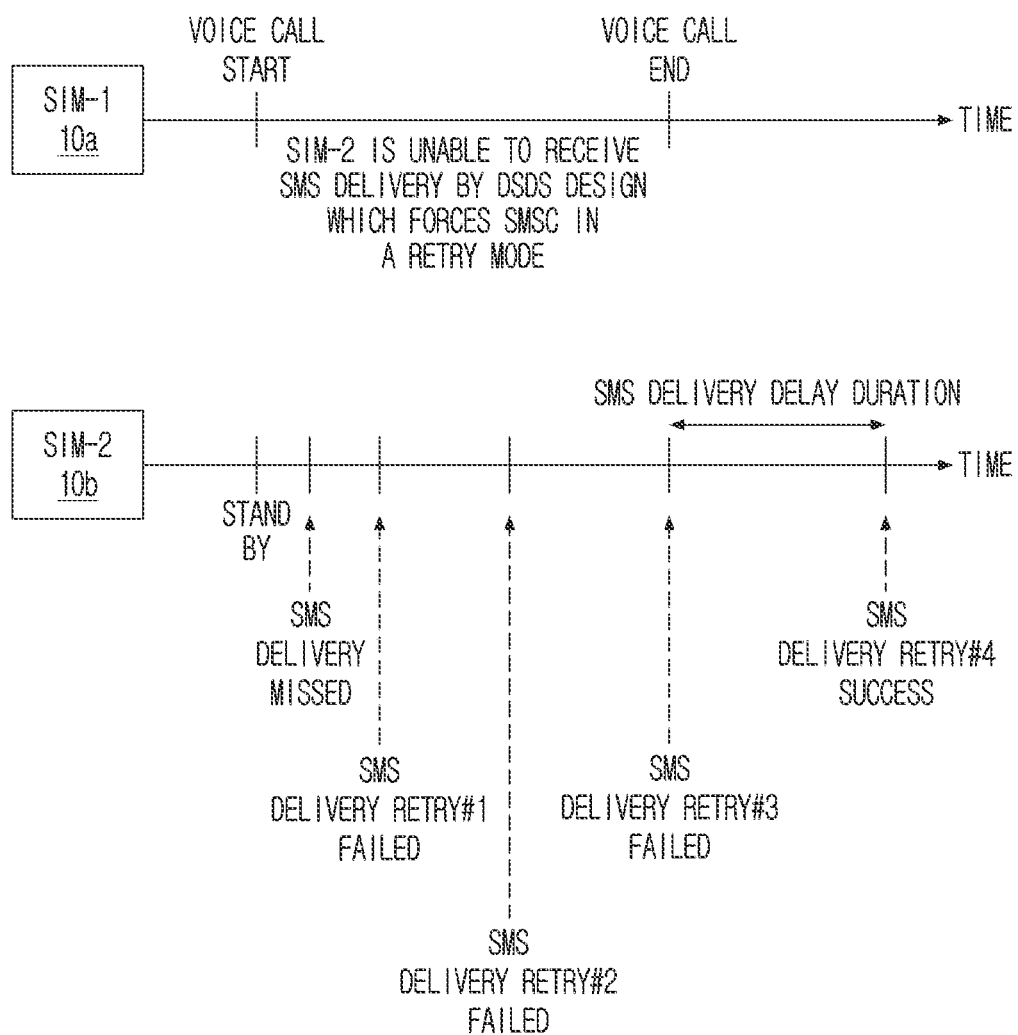
FIG. 1 illustrates a problem in existing Short Message Service (SMS) delivery method(s), according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Although the terms first, second, etc. may be used herein to describe various elements, these elements should not be limited by these terms. These terms are generally only used to distinguish one element from another.

Throughout this disclosure, the terms "first SIM" and "SIM-1" are used interchangeably and mean the same. The terms "second SIM" and "SIM-2" are used interchangeably and mean the same.

In conventional User Equipment (UE), when one SIM (e.g. SIM-1) is engaged in a voice call, then other SIM (e.g. SIM-2) would not have an opportunity to use a baseband for transmission/reception of user data (single Tx/Rx chain in a DSDS device) and will remain in standby mode (or say an idle mode). Even if a server page is decoded by the DSDS device, the DSDS must not be able to respond to the server. In an idealistic situation, when the UE experiences Radio Link Failure (RLF) in a connected mode, the server (e.g. network entities) knows while the UE sends a Radio Resource Control (RRC)-Reestablishment request to the server or when the UE goes to out of service, the server gets to know due to a Registration request in an NR communication/Tracking Area Update (TAU) request or Attach request in an LTE communication sent by the UE after gaining service.

But in the case of the DSDS device, there is no such reestablishment/re-registration procedure is mandatory, as the UE might still be in service, but might not be able to respond to pages of the server or the UE may internally release resources for the SIM-2 while the SIM-1 is in the voice call for a prolonged duration. While the SIM-1's voice call is ongoing, the SIM-2 might end up going out-of-sync from the server (e.g. LTE MME or NR AMF), resulting in the server being unable to page the UE for any calls on SIM-2. Normally calls end up going to voice mail/Interactive Voice Response (IVR) for not-reachable to the UE. After SIM-1's voice call ends, since there is no mandate for the UE to do any kind of re-registration/re-establishment on the SIM-2, the server might still consider the UE is in out-of-service as previous pages might have no responses and the server would stop paging to the UE to save power (possible implementation at SMSC widely followed by many operators globally). This might affect incoming pages for calls also for the SIM-2 after the SIM-1's voice call is ended. As a result, unless the context of the UE and the server is reset, there is no guarantee for smooth services without any disruptions.

In conventional methods and systems, while the SIM-1's voice call is ongoing, the SIM-2 might end up going out-of-sync from the server (e.g. LTE MME or NR AMF). If any SMS is sent to the SIM-2 while the SIM-1's voice call is ongoing, the server might page the UE. Though the SIM-2 might be able to read paging from the server, the UE shall not be able to respond to the server due to a DSDS design. So, the UE might not be able to respond to the server due to ongoing voice calls on the SIM-1. A paging entity (or SMSC) might page the UE a few times, and if there is no response from the UE, they might delay the further paging (e.g. in exponential format) due to power saving mechanism via timers (e.g. SMSC timer). The end of voice call on the SIM-1 is not known to the SIM-2 network, so ideally when the retries for SMS page is done and the server blocks paging transmission to the SIM-2 identity for some timer period, after voice call end on the SIM-1, the page is immediately not retrieved due to the SIM-2 not doing any kind of re-registration/signaling to a SIM-2 network (i.e. server). So, the server (e.g. SMSC) might not retry until the timer expiry at corresponding network entity. This will result in a delay in SMS delivery, and even after the SIM-1's voice call ends, the SIM-2 pending SMS will not be immediately delivered.

Accordingly, embodiments herein disclose a method for controlling Short Message Service (SMS) communication by a Dual SIM Dual Standby (DSDS) device in a wireless communication network, where the DSDS device includes a first Subscriber Identity Module (SIM) and a second SIM. The method includes detecting, by the DSDS device, that the first SIM is on a voice call and the second SIM is in a standby mode. Further, the method includes determining, by the DSDS device, whether page information is received at the second SIM from a server during the voice call of the first SIM, where the page information indicates that a pending SMS is available at the server. Further, the method includes determining, by the DSDS device, whether the voice call of the first SIM is terminated. Further, the method includes performing, by the DSDS device, one of, immediately sending a refresh registration signal to the server in response to determining that the page information is received at the second SIM from the server during the voice call of the first SIM and the voice call of the first SIM is terminated or immediately sending the refresh registration signal to the server in response to determining that the voice call of the first SIM is terminated. Further, the method includes immediately receiving, by the DSDS device, the pending SMS(es) from the server in response to sending the refresh registration signal to the server.

Accordingly, embodiments herein disclose a method for controlling the SMS communication by the server in the wireless communication network. The method includes detecting, by the server, that the first SIM of the DSDS device is on the voice call and the second SIM is in the standby mode. Further, the method includes sending, by the server, the page information to the second SIM during the voice call of the first SIM, where the page information indicates that the pending SMS(es) is available at the server. Further, the method includes determining, by the server, whether the acknowledgement of the page information is received from the second SIM. Further, the method includes initiating, by the server, the SMSC timer in response to determining that the acknowledgement of the page information is not received from the second SIM. Further, the method includes determining, by the server, whether the refresh registration signal is received from the second SIM. Further, the method includes terminating, by the server, the SMSC timer in response to determining that the refresh registration signal is received from the second SIM. Further, the method includes immediately sending, by the server, the pending SMS(es) to the second SIM associated with the page information.

Accordingly, embodiments herein disclose a method for controlling the SMS communication by the DSDS device in the wireless communication network, where the DSDS device includes the first SIM and the second SIM. The method includes detecting, by the DSDS device, that the first SIM is on the voice call and the second SIM is in the standby mode. Further, the method includes determining, by the DSDS device, whether page information is received at the second SIM from the server during the voice call of the first SIM and a flag is set at the DSDS device, where the page information indicates that the pending SMS(es) is available at the server. Further, the method includes determining, by the DSDS device, whether the voice call of the first SIM is terminated. Further, the method includes performing, by the DSDS device, one of, triggering an event on the second SIM in response to determining that the page information is received at the second SIM from the server during the voice call of the first SIM, the flag is set at the DSDS device and the voice call of the first SIM is terminated or triggering the event on the second SIM in response to determining that the voice call of the first SIM is terminated. Further, the method includes immediately receiving, by the DSDS device, the pending SMS(es) from the server in response to triggering the event.

Accordingly, embodiments herein disclose the DSDS device for controlling the SMS communication in the wireless communication network. The DSDS device includes a DSDS service controller coupled with a processor and a memory. The DSDS service controller detects that the first SIM is on the voice call and the second SIM is in the standby mode. Furthermore, the DSDS service controller determines whether page information is received at the second SIM from a server during the voice call of the first SIM, where the page information indicates that the pending SMS(es) is available at the server. Furthermore, the DSDS service controller determines whether the voice call of the first SIM is terminated. Furthermore, the DSDS service controller immediately sends the refresh registration signal to the server in response to determining that the page information is received at the second SIM from the server during the voice call of the first SIM and the voice call of the first SIM is terminated. Furthermore, the DSDS service controller immediately sends the refresh registration signal to the server in response to determining that the voice call of the first SIM is terminated. Furthermore, the DSDS service controller immediately receives the pending SMS(es) from the server in response to sending the refresh registration signal to the server.

Accordingly, embodiments herein disclose the server for controlling the SMS communication in the wireless communication network. The server includes a DSDS service controller coupled with a processor and a memory. The DSDS service controller detects that the first SIM of the DSDS device is on the voice call and the second SIM is in the standby mode. Furthermore, the DSDS service controller sends the page information to the second SIM during the voice call of the first SIM, where the page information indicates that the pending SMS(es) is available at the server. Furthermore, the DSDS service controller determines whether the acknowledgement of the page information is received from the second SIM. Furthermore, the DSDS service controller initiates the SMSC timer in response to determining that the acknowledgement of the page information is not received from the second SIM. Furthermore, the DSDS service controller determines whether the refresh registration signal is received from the second SIM. Furthermore, the DSDS service controller terminates the SMSC timer in response to determining that the refresh registration signal is received from the second SIM. Furthermore, the DSDS service controller immediately sends the pending SMS(es) to the second SIM associated with the page information.

Accordingly, embodiments herein disclose the DSDS device for controlling the SMS communication in the wireless communication network. The DSDS device includes a DSDS service controller coupled with a processor and a memory. The DSDS service controller detects that the first SIM is on the voice call and the second SIM is in the standby mode. Furthermore, the DSDS service controller determines whether page information is received at the second SIM from a server during the voice call of the first SIM and a flag is set at the DSDS device, where the page information indicates that the pending SMS(es) is available at the server. Furthermore, the DSDS service controller determines whether the voice call of the first SIM is terminated. Furthermore, the DSDS service controller triggers the event on the second SIM in response to determining that the page information is received at the second SIM from the server during the voice call of the first SIM, the flag is set at the DSDS device and the voice call of the first SIM is terminated. Furthermore, the DSDS service controller triggers the event on the second SIM in response to determining that the voice call of the first SIM is terminated. Furthermore, the DSDS service controller immediately receives the pending SMS(es) from the server in response to triggering the event.

Unlike existing methods and systems, the proposed method allows the DSDS device to immediately send the refresh registration signal to the server by detecting that page information is received at the second SIM from the server during the voice call of a first SIM and/or the voice call of the first SIM is terminated. The page information indicates that the pending SMS(es) is available at the server. The refresh registration signal indicates to update registration on the server (e.g. Voice over Long-Term Evolution (VoLTE) registration, Voice over New Radio (VoNR) registration, etc.) for the second SIM and indicates to stop an SMSC timer at the server. As a result, the DSDS device immediately receives the pending SMS(es) from the server and the server does not need to wait for the SMSC timer to expire for sending the pending SMS(es), which avoids delay in SMS delivery and enhances user's experience.

Unlike existing methods and systems, the proposed method allows the DSDS device to immediately send the refresh registration signal to the server by detecting that any page information is received at the second SIM from the server during the voice call of the first SIM and the voice call of the first SIM is terminated. As a result, the DSDS device sends the refresh registration signal to the server only when the page information is received at the second SIM from the server during the voice call of the first SIM, which decreases unnecessary signaling between the DSDS device and the server or in another word the DSDS device does not send the refresh registration signal to the server after each termination of the voice call, consumes less power.

Unlike existing methods and systems, the proposed method allows the DSDS device to send the refresh registration signal with a reason header value (e.g. DSDS: service ready or some mutually agreed key string), so that the server does not have to check for an active SMSC timer for each refresh registration signal from the DSDS device.

Unlike existing methods and systems, the proposed method allows the DSDS device to trigger the event on the second SIM by detecting that the voice call of the first SIM is terminated and/or the page information is received at the second SIM from the server during the voice call of the first SIM, the flag is set at the DSDS device. The flag is set at the DSDS device when the page information is received at the second SIM from the server during the voice call of the first SIM. The event includes an IP Multimedia Subsystem (IMS) re-register procedure, a mobility update procedure, and a refresh IMS subscribe procedure. As a result, the DSDS device immediately receives the pending SMS(es) from the server, which avoids delay in the SMS delivery and enhances user's experience.

Referring now to the drawings, and more particularly to FIGS. 2A, 2B, 3, 4, 5A, 5B, 6A, 6B, 7A, 7B, and 8, where similar reference characters denote corresponding features consistently throughout the figures, there are shown preferred embodiments.

Figure 2A:
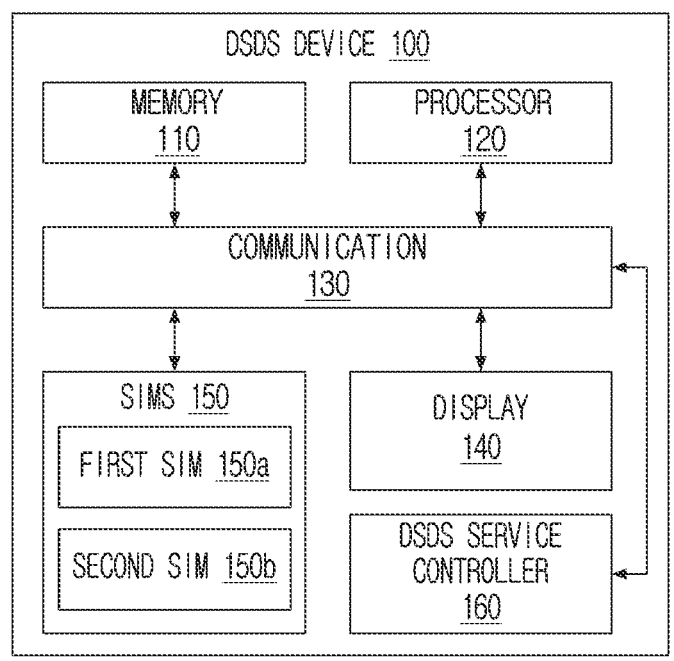
FIG. 2A illustrates a block diagram of a Dual SIM Dual Standby (DSDS) device for controlling SMS communication in a wireless communication network, according to an embodiment of the disclosure.

FIG. 2A illustrates a block diagram of a Dual SIM Dual Standby (DSDS) device (100) for controlling SMS communication in a wireless communication network, according to an embodiment of the disclosure.

The wireless communication network includes the DSDS device (100) and a server (200) (not shown in FIG. 2A). Examples of the DSDS device (100) include, but are not limited to a smartphone, a tablet computer, a Personal Digital Assistance (PDA), an Internet of Things (IoT) device, a wearable device, etc.

Referring to FIG. 2A, in an embodiment, the DSDS device (100) includes a memory (110), a processor (120), a communicator (130), a display (140), SIMs (150) (e.g. first SIM (150*a*) and second SIM (150*b*)), and a DSDS service controller (160).

In an embodiment, the memory (110) stores a status (e.g. active mode/connected mode, standby mode, etc.) of the first SIM (150*a*) and second SIM (150*b*) and a status (e.g. set or not set) of a flag (or said an identifier which is set or reset based on an event (e.g. call end on SIM-1). If the identifier is set then the DSDS device (100) performs one of, for example, a refresh IMS subscriber, a mobility update procedure trigger, an IMS re-register procedure trigger). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the DSDS device (100), a cloud storage, or any other type of external storage.

The processor (120) communicates with the memory (110), the communicator (130), the display (140), the SIMs (150), and the DSDS service controller (160). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

The communicator (130) is configured for communicating internally between internal hardware components and with external devices (e.g. server (200), etc.) via one or more networks (e.g. Radio technology). The communicator (130) includes an electronic circuit specific to a standard that enables wired or wireless communication.

The DSDS service controller (160) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the DSDS service controller (160) detects that the first SIM (150a) is on a voice call and the second SIM (150b) is in a standby mode. Furthermore, the DSDS service controller (160) determines whether page information is received at the second SIM (150b) from the server (200) during the voice call of the first SIM (150a), where the page information indicates that a pending SMS is available at the server (200). The server (200) provides a service of IP Multimedia Subsystem (IMS) and a service of Short Message Service Center (SMSC). Furthermore, the DSDS service controller (160) determines whether the voice call of the first SIM (150a) is terminated.

Furthermore, the DSDS service controller (160) immediately sends a refresh registration signal to the server (200) in response to determining that the page information is received at the second SIM (150b) from the server (200) during the voice call of the first SIM (150a) and the voice call of the first SIM (150a) is terminated. Furthermore, the DSDS service controller (160) immediately sends the refresh registration signal to the server (200) in response to determining that the voice call of the first SIM (150a) is terminated.

The refresh registration signal indicates to stop an SMSC timer at the server (200) and immediately sends the pending SMS(es) associated with the page information to the second SIM (150b). Furthermore, the refresh registration signal includes a reason header value, and where the reason header value includes a DSDS service ready, a DSDS service resume, and a mutually agreed key string (e.g. "DSDS Service Ready" or "DSDS Service Resume" or any mutually agreed key string between IMS server and the UE (DSDS device (100)). Furthermore, the DSDS service controller (160) immediately receives the pending SMS(es) from the server (200) in response to sending the refresh registration signal to the server (200).

Furthermore, the DSDS service controller (160) determines whether page information is received at the second SIM (150b) from a server (200) during the voice call of the first SIM (150a) and a flag is set at the DSDS device (100), where the page information indicates that the pending SMS is available at the server (200). Furthermore, the DSDS service controller (160) determines whether the voice call of the first SIM (150a) is terminated. Furthermore, the DSDS service controller (160) triggers an event on the second SIM (150b) in response to determining that the page information is received at the second SIM (150b) from the server (200) during the voice call of the first SIM (150a), the flag is set at the Server (200) and the voice call of the first SIM (150a) is terminated. Furthermore, the DSDS service controller (160) triggers the event on the second SIM (150b) in response to determining that the voice call of the first SIM (150a) is terminated. The event includes an IP Multimedia Subsystem (IMS) re-register procedure, a mobility update procedure, and a refresh IMS subscribe procedure.

Furthermore, the DSDS service controller (160) determines whether the second SIM (150b) is in the connected mode or the standby mode before establishing the voice call on the first SIM (150a). Furthermore, the DSDS service controller (160) sends a suspend message to the server (200) in response to determining that the second SIM (150b) is in the connected mode before establishing the voice call on the first SIM (150a). Furthermore, the DSDS service controller (160) sends the suspend message to the server (200) by entering the connected mode in response to determining that the second SIM (150b) is in the standby mode before establishing the voice call on the first SIM (150a). The suspend message indicates to maintain context information at the server (200).

Although FIG. 2A shows various hardware components of the DSDS device (100) but it is to be understood that other embodiments are not limited thereon. In other embodiments, the DSDS device (100) may include a lessor or a greater number of components. Further, the labels or names of the components are used only for illustrative purpose and does not limit the scope of the disclosure. One or more components can be combined to perform the same or substantially similar function to control the SMS communication in the wireless communication network.

Figure 2B:
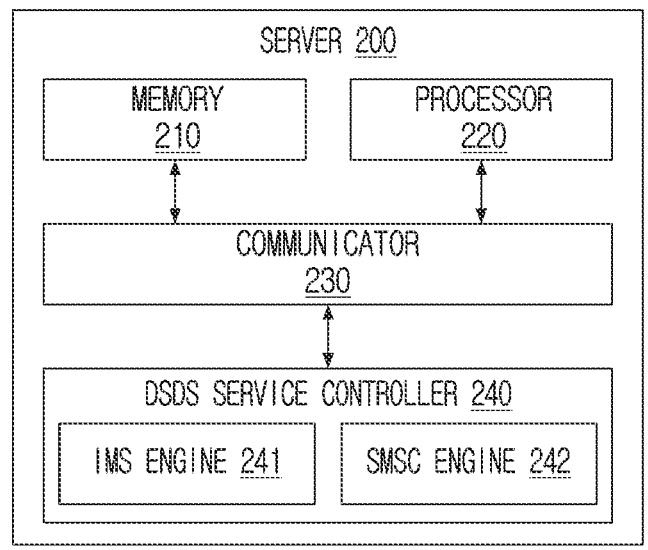
FIG. 2B illustrates a block diagram of a server for controlling the SMS communication in the wireless communication network, according to an embodiment of the disclosure.

FIG. 2B illustrates a block diagram of the server (200) for controlling the SMS communication in the wireless communication network, according to an embodiment of the disclosure.

Examples of the server (200) include, but are not limited to, a base station, an E-UTRAN Node B (eNodeB), a gNodeB, a Mobility Management Entity (MME), an Access and Mobility Management Function (AMF), an SMSC, and IP Multimedia Subsystem (IMS).

Referring to FIG. 2B, in an embodiment, the server (200) includes a memory (210), a processor (220), a communicator (230), and a DSDS service controller (240).

In an embodiment, the memory (210) stores the status (e.g. active mode/connected mode, standby mode, etc.) of the first SIM (150a) and second SIM (150b), the status (e.g. set or not set) of the flag, and information regarding the SMSC timer. The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable read only memories (EPROMs) or electrically erasable and programmable ROM (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). The memory (210) can be an internal storage unit or it can be an external storage unit of the server (200), a cloud storage, or any other type of external storage.

The processor (220) communicates with the memory (210), the communicator (230), and the DSDS service controller (240). The processor (220) is configured to execute instructions stored in the memory (210) and to perform various processes. The processor (220) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) is configured for communicating internally between internal hardware components and with external devices (e.g. DSDS device (100), etc.) via one or more networks (e.g. Radio technology). The communicator (230) includes an electronic circuit specific to a standard that enables wired or wireless communication.

The DSDS service controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the DSDS service controller (240) includes an IMS engine (241) and an SMSC engine (242). The IMS engine (241) sends page information to the second SIM (150b) during the voice call of the first SIM (150a), where the page information indicates that the pending SMS(es) is available at the server (200) The IMS engine (241) then determines whether an acknowledgement of the page information is received from the second SIM (150b) and informs the same (acknowledgement information) to the SMSC engine (242). The SMSC engine (242) then initiates the SMSC timer in response to determining that the acknowledgement of the page information is not received from the second SIM (150b). The IMS engine (241) then determines whether the refresh registration signal is received from the second SIM (150b) and informs the same (the refresh registration signal information) to the SMSC engine (242). The SMSC engine (242) then terminates the SMSC timer in response to determining that the refresh registration signal is received from the second SIM (150b). The SMSC engine (242)/the IMS engine (241) immediately sends the pending SMS(es) to the second SIM (150b) associated with the page information.

Although FIG. 2B shows various hardware components of the server (200) but it is to be understood that other embodiments are not limited thereon. In other embodiments, the server (200) may include a lessor or a greater number of components. Further, the labels or names of the components are used only for illustrative purpose and does not limit the scope of the disclosure. One or more components can be combined to perform the same or substantially similar function to control SMS communication in the wireless communication network.

Figure 3:
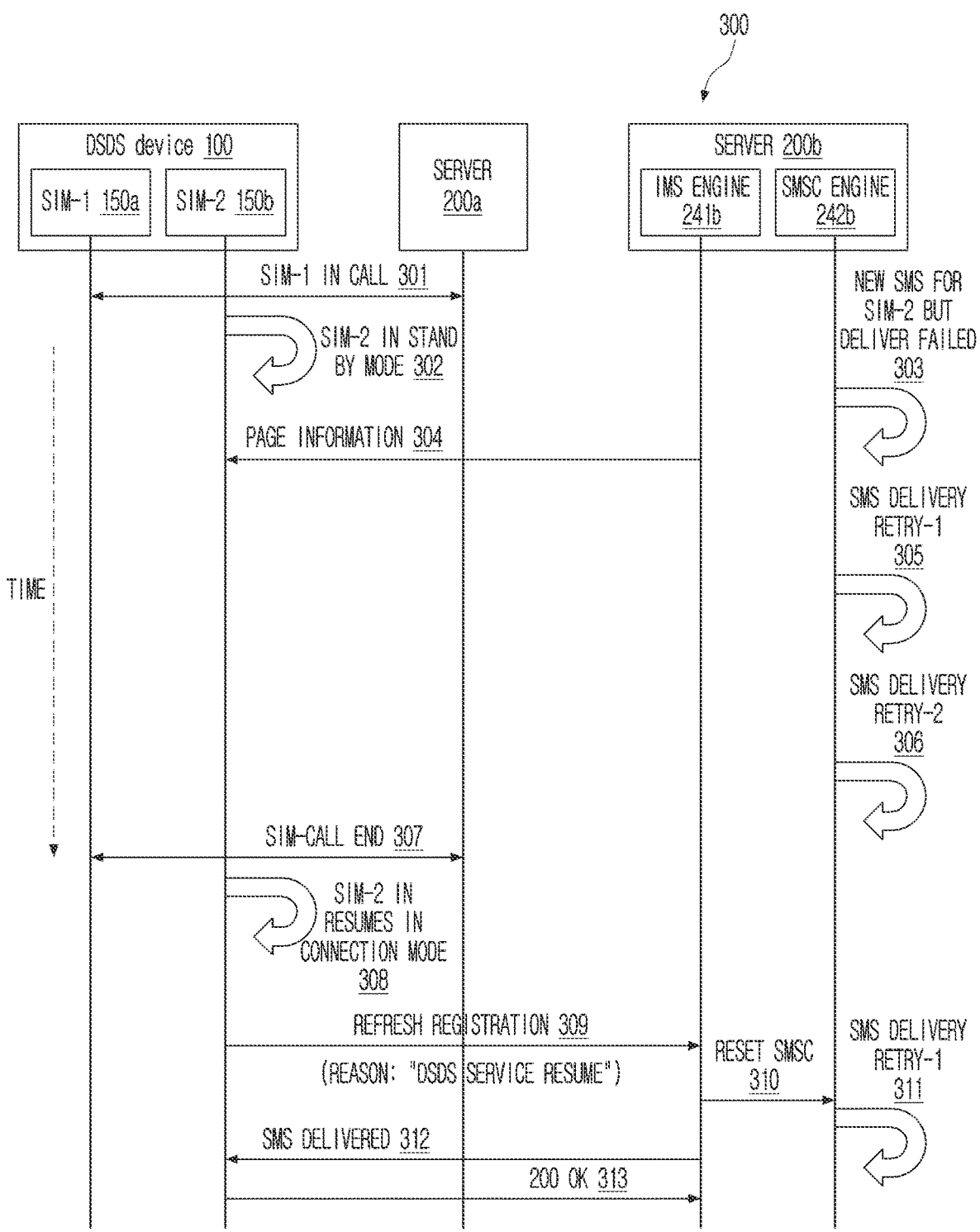
FIG. 3 is an example sequence diagram illustrating a method for controlling the SMS communication to avoid/reduce SMS delivery delays in the wireless communication network, according to an embodiment of the disclosure.

FIG. 3 is an example sequence diagram (300) illustrating a method for controlling the SMS communication to avoid/reduce SMS delivery delays in the wireless communication network, according to an embodiment of the disclosure.

Referring to FIG. 3, at operations 301-302, the method includes detecting that the first SIM (150a) is on the voice call using a server (200a) and the second SIM (150b) is in the standby mode. Here, the server (200a) represents network entities associated with the first SIM (150a) and a server (200b) represents network entities associated with the second SIM (150b). At operation 303, the method includes identifying a new SMS (e.g. pending SMS) is received for the second SIM (150b) at an SMSC engine (242b). The server (200b) then attempts to send the new SMS to the second SIM (150b) of the DSDS device (100), but due to the standby mode of the second SIM (150b) delivery of the new SMS is unsuccessful.

At operation 304, the method includes sending the page information to the second SIM (150b) during the voice call of the first SIM (150a) but the page information is ignored due to the standby mode of the second SIM (150b) and the server (200b) is not received the acknowledgement of the page information from the second SIM (150b).

At operations 305-306, the method includes initiating, by the server (200b), the SMSC timer in response to determining that the acknowledgement of the page information is not received from the second SIM (150b). The server (200b) retries multiple times to send the new SMS to the second SIM (150b) by utilizing a retry timer (retry mechanism or say the SMSC timer), where a time gap between retries would increase exponentially, but due to the standby mode of the second SIM (150b), the delivery of the new SMS is unsuccessful. At operations 307-308, the method includes identifying that the voice call of the first SIM (150a) is terminated and resuming services of the second SIM (150b).

At operations 309, 310, and 311, the method includes immediately sending the refresh registration signal to the server (200b) in response to determining that the page information is received at the second SIM (150b) from the server (200a) during the voice call of the first SIM (150a) and the voice call of the first SIM (150a) is terminated. The refresh registration signal indicates to do refresh/update on an IMS VoLTE registration for the second SIM (150b) and/or a VoNR registration for the second SIM (150b). Furthermore, the refresh registration signal indicates to stop the SMSC timer at the server (200b). Upon stopping the SMSC timer, the server (200b) immediately sends the new SMS associated with the page information to the second SIM (150b), which will avoid the delay with new SMS delivery caused by waiting for the expiration of the SMSC timer. At operations 312-313, the method includes immediately receiving the new SMS from the server (200b) in response to sending the refresh registration signal to the server (200).

Due to sending the refresh registration signal after every call, load on both the DSDS device (100) and the server (200b) increases. Furthermore, the refresh registration signal of the server (200b) (e.g. the IMS engine (241b)) is utilized for other purposes also like updating a validity duration of an IMS Registration. So, the IMS engine (241b)) triggers a check for active SMSC timer for every refresh registration signal from the DSDS device (100), which increases load on the server (200b) (e.g. the IMS engine (241b)).

In an embodiment, the refresh registration signal includes the reason header value to reduce the load on both the DSDS device (100) and the server (200b) or to avoid unnecessary interaction between the IMS engine (241b) and the SMSC engine (242b). The reason header value includes the DSDS service ready, the DSDS service resume, and the mutually agreed key string. On receiving the reason header value, the IMS engine (241b) decides to reset the SMSC timer(s). If the IMS engine (241b) does not receive the reason header value in the refresh registration signal, then the IMS engine (241b) doesn't have to reset the SMSC timer(s) and doesn't have to interact with the SMSC engine (242b).

Figure 4:
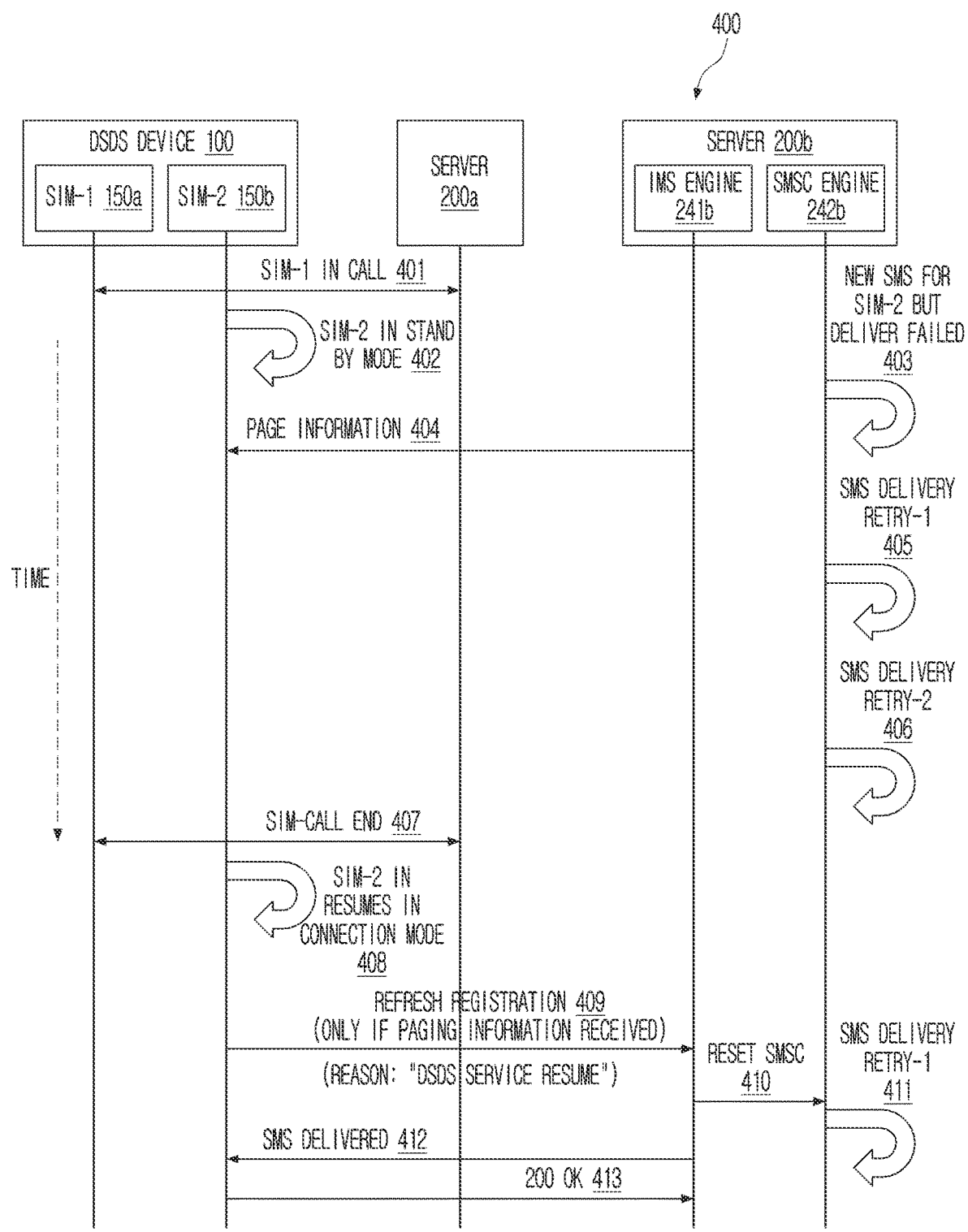
FIG. 4 is another example sequence diagram illustrating the method for controlling the SMS communication to avoid/reduce SMS delivery delays in the wireless communication network, according to an embodiment of the disclosure.

FIG. 4 is another example sequence diagram (400) illustrating the method for controlling the SMS communication to avoid/reduce the SMS delivery delays in the wireless communication network, according to an embodiment of the disclosure.

Referring to FIG. 4, at operations 401-402, the method includes detecting that the first SIM (150a) is on the voice call and the second SIM (150b) is in the standby mode. Here, the server (200a) represents network entities associated with the first SIM (150a) and the server (200b) represents network entities associated with the second SIM (150b). At operation 403, the method includes identifying the new SMS (e.g. pending SMS) is received for the second SIM (150b) at the SMSC engine (242b). The server (200b) then attempts to send the new SMS to the second SIM (150b) of the DSDS device (100), but due to the standby mode of the second SIM (150b), the delivery of the new SMS is unsuccessful.

At operation 404, the method includes sending the page information to the second SIM (150b) during the voice call of the first SIM (150a) but the page information is ignored due to the standby mode of the second SIM (150b) and the server (200b) is not received the acknowledgement of the page information from the second SIM (150b).

At operations 405-406, the method includes initiating, by the server (200b), the SMSC timer in response to determining that the acknowledgement of the page information is not received from the second SIM (150b). The server (200b) retries multiple times to send the new SMS to the second SIM (150b) by utilizing the retry timer (retry mechanism or say the SMSC timer), where the time gap between retries would increase exponentially, but due to the standby mode of the second SIM (150b) delivery of the new SMS is unsuccessful. At operations 407-408, the method includes identifying the voice call of the first SIM (150a) is terminated and resuming services of the second SIM (150b).

At operations 409, 410 and 411, the method includes immediately sending the refresh registration signal to the server (200b) only if the paging information is received at the second SIM (150b) during the voice call of the first SIM (150a) (i.e. 404) and the voice call of the first SIM (150a) is terminated. The refresh registration signal indicates to do refresh/update on the IMS VoLTE registration for the second SIM (150b) and/or the VoNR registration for the second SIM (150b). Furthermore, the refresh registration signal indicates to stop the SMSC timer at the server (200b). Upon stopping the SMSC timer, the server (200b), immediately sends the new SMS associated with the page information to the second SIM (150b), which will avoid the delay with new SMS delivery caused by waiting for the expiration of the SMSC timer. At operations 412-413, the method includes immediately receiving the new SMS from the server (200b) in response to sending the refresh registration signal to the server (200).

In an embodiment, to avoid unnecessary refresh register after every call, the DSDS device (100) relies on the paging information from the server (200), which makes sure of blocking unnecessary refresh to the server (200) (e.g. the IMS engine (241b)). Even when the second SIM (150b) is on the standby mode, the second SIM (150b) receives the paging information from the server (200) during the standby mode. The DSDS device (100) monitors the paging information received on the second SIM (150b) while the voice call is ongoing on the first SIM (150a). Once the voice call ends with the first SIM (150a), the DSDS device (100) checks if any the paging information is received and take the decision to send refresh on the server (200) (e.g. IMS VoLTE/VoNR registration) for the second SIM (150b).

Figure 5A:
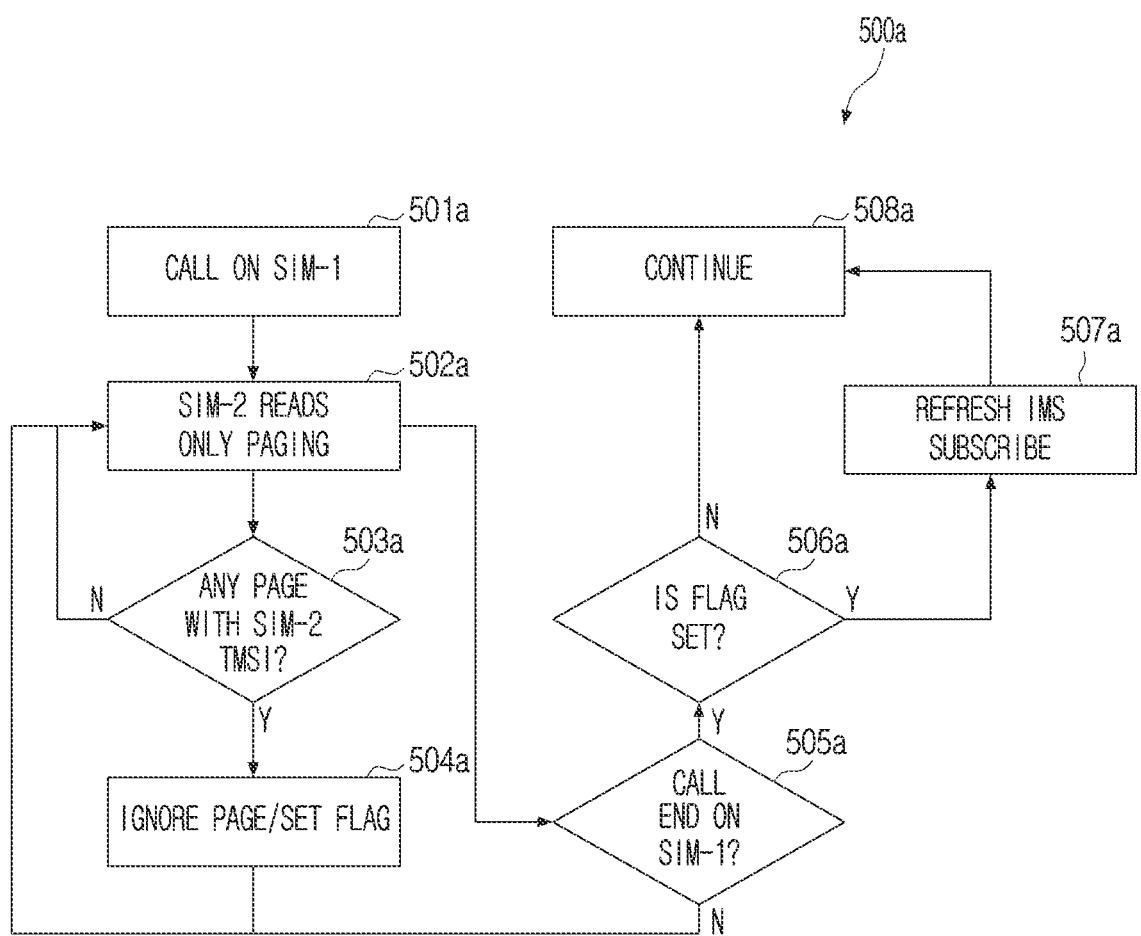
FIGS. 5A and 5B illustrate flow diagrams for controlling the SMS communication to avoid/reduce SMS delivery delays in the wireless communication network by triggering a refresh IP Multimedia Subsystem (IMS) subscribe procedure, according to various embodiments of the disclosure.
Figure 5B:
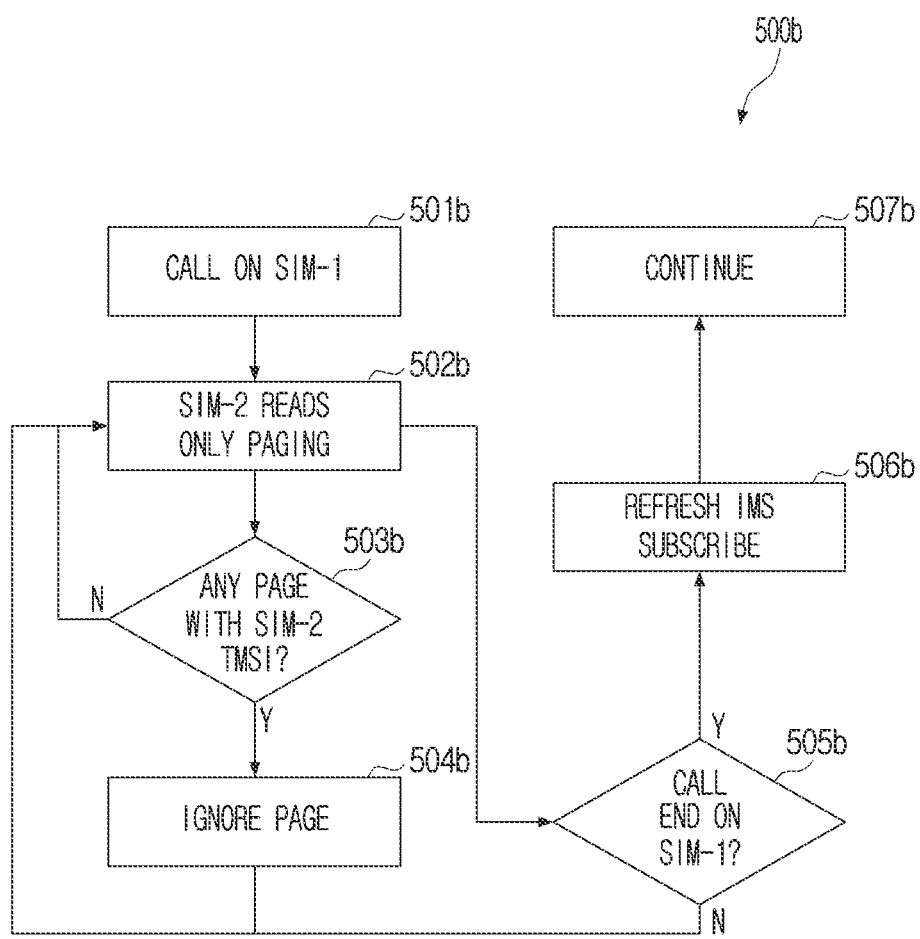

FIGS. 5A and 5B illustrate flow diagrams (500a and 500b) for controlling the SMS communication to avoid/reduce the SMS delivery delays in the wireless communication network by triggering the refresh IP Multimedia Subsystem (IMS) subscribe procedure, according to various embodiments of the disclosure.

Referring to FIG. 5A, at operations 501a and 502a, the first SIM (150a) is on the voice call and the second SIM (150b) is in the standby mode or say the second SIM (150b) reads the page information only. At operation 503a, the DSDS device (100) continuously monitors that if any page information (relates to the pending SMS or pending call or pending data at the server (200)) receives on the second SIM (150b) during the voice call of the first SIM (150a). At operation 504a, the DSDS device (100) identifies that the page information receives on the second SIM (150b) during the voice call of the first SIM (150a), and ignores the received page information as the second SIM (150b) is in the standby mode, and sets the flag in the DSDS device (100) when any page information receives on the second SIM (150b) during the voice call of the first SIM (150a).

At operations 505a-506a, the DSDS device (100) determines whether the voice call of the first SIM (150a) is terminated. The DSDS device (100) continuously monitors that if any page information receives on the second SIM (150b) during the voice call of the first SIM (150a) in response to determining that the voice call of the first SIM (150a) is not terminated. The DSDS device (100) determines whether the flag is set in the DSDS device (100) in response to determining that the voice call of the first SIM (150a) is terminated. At operations 507a-508a, the DSDS device (100) triggers the event (i.e. refresh IMS subscribe procedure/as per Request for Comments (RFC) 3265) on the second SIM (150b) when the page information is received at the second SIM (150b) from the server (200) during the voice call of the first SIM (150a), the flag is set at the DSDS device (100) and the voice call of the first SIM (150a) is terminated. If the event triggers, then the DSDS device (100) and sever (200) performs the various operation as defined in 3rd Generation Partnership Project (3GPP) standard to complete the event, or the DSDS device (100) and sever (200) continue monitoring other operations (e.g. 501a-506a).

Referring to FIG. 5B, at operations 501b and 502b, the first SIM (150a) is on the voice call and the second SIM (150b) is in the standby mode or say the second SIM (150b) reads the page information only. At operation 503b, the DSDS device (100) continuously monitors that if any page information (relates to the pending SMS or pending call or pending data at the server (200)) receives on the second SIM (150b) during the voice call of the first SIM (150a). At operation 504b, the DSDS device (100) identifies that the page information receives on the second SIM (150b) during the voice call of the first SIM (150a) and ignores the received page information as the second SIM (150b) is in the standby mode.

At operation 505b, the DSDS device (100) determines whether the voice call of the first SIM (150a) is terminated. The DSDS device (100) continuously monitors that if any page information receives on the second SIM (150b) during the voice call of the first SIM (150a) in response to determining that the voice call of the first SIM (150a) is not terminated. At operations 506b-507b, the DSDS device (100) triggers the event (i.e. refresh IMS subscribe procedure) on the second SIM (150b) when the page information is received or not received at the second SIM (150b) from the server (200) during the voice call of the first SIM (150a) and the voice call of the first SIM (150a) is terminated.

Figure 6A:
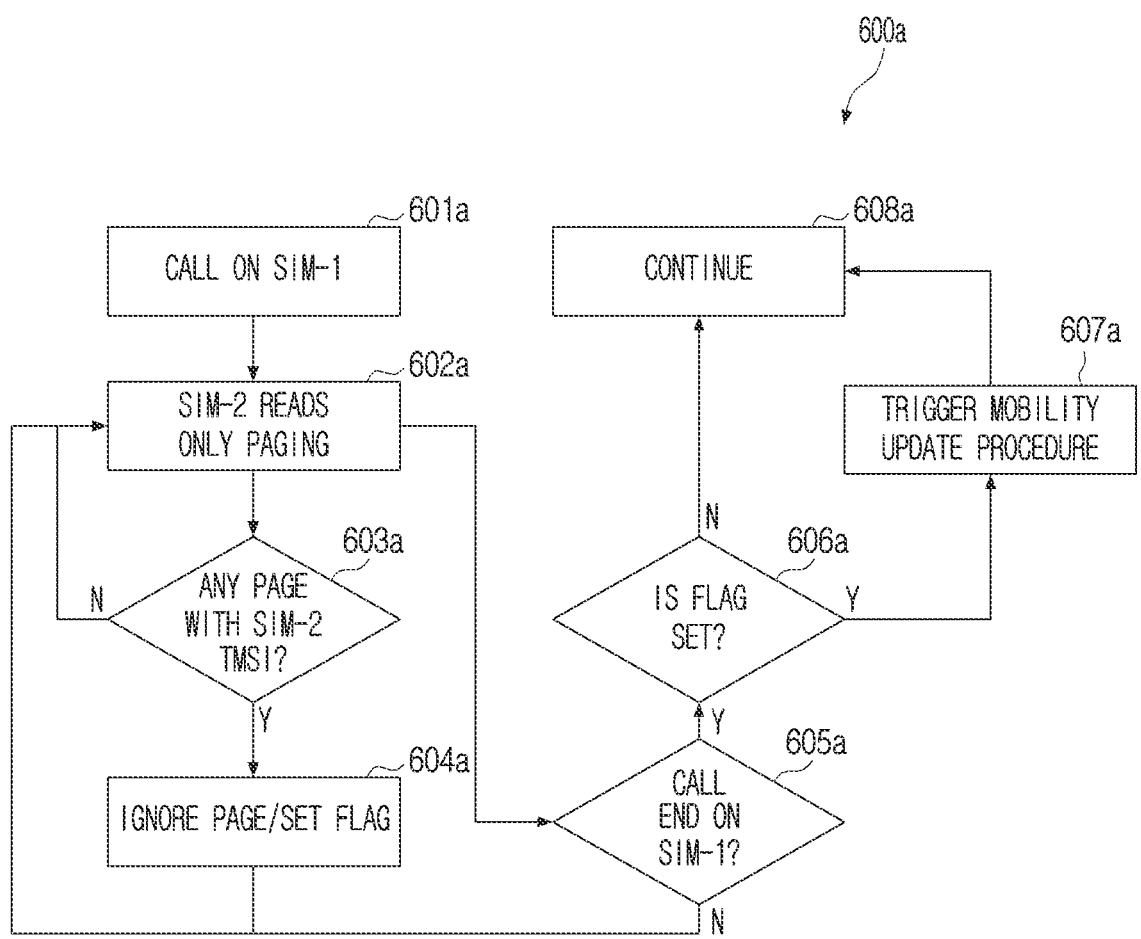
FIGS. 6A and 6B illustrate flow diagrams for controlling the SMS communication to avoid/reduce SMS delivery delays in the wireless communication network by triggering a mobility update procedure, according to various embodiments of the disclosure.
Figure 6B:
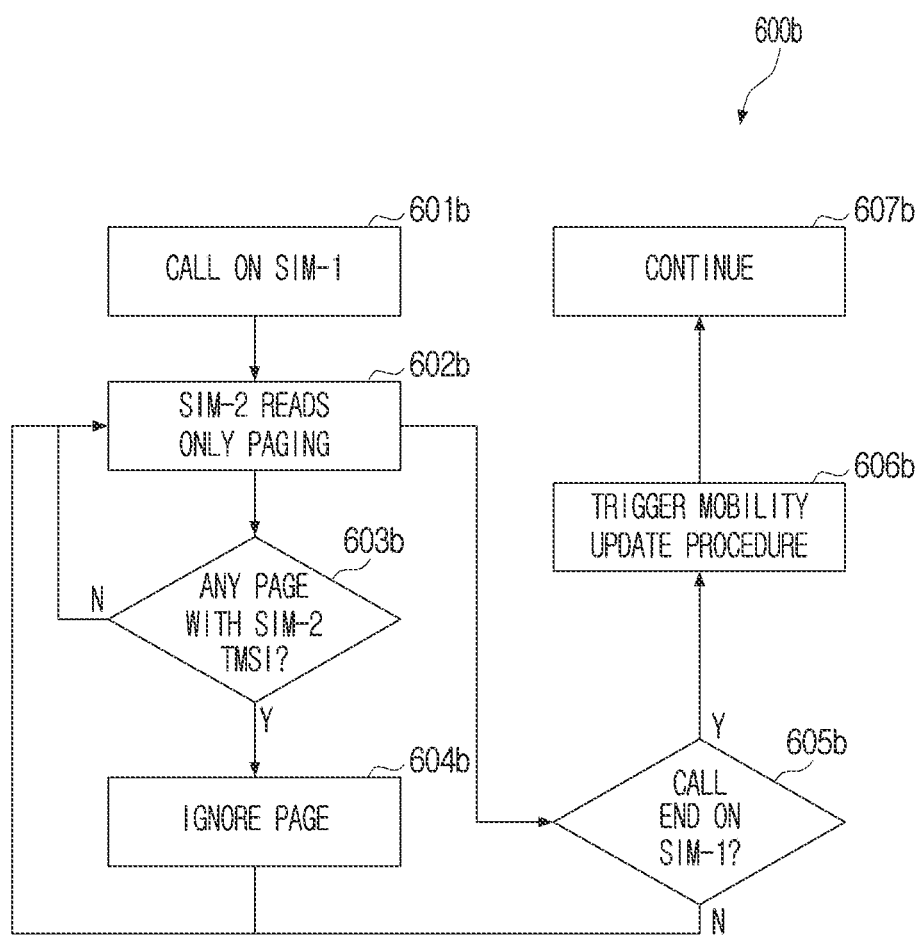

FIGS. 6A and 6B illustrate flow diagrams (600a and 600b) for controlling the SMS communication to avoid/reduce the SMS delivery delays in the wireless communication network by triggering a mobility update procedure, according to various embodiments of the disclosure.

Referring to FIG. 6A, at operations 601a-602a, the first SIM (150a) is on the voice call and the second SIM (150b) is in the standby mode or say the second SIM (150b) reads the page information only. At operation 603a, the DSDS device (100) continuously monitors that if any page information (relates to the pending SMS or pending call or pending data at the server (200)) receives on the second SIM (150b) during the voice call of the first SIM (150a). At operation 604a, the DSDS device (100) identifies that the page information receives on the second SIM (150b) during the voice call of the first SIM (150a), ignoring the received page information as the second SIM (150b) is in the standby mode, and setting the flag in the DSDS device (100) when any page information receives on the second SIM (150b) during the voice call of the first SIM (150a).

At operations 605a-606a, the DSDS device (100) determines whether the voice call of the first SIM (150a) is terminated. The DSDS device (100) continuously monitors that if any page information receives on the second SIM (150b) during the voice call of the first SIM (150a) in response to determining that the voice call of the first SIM (150a) is not terminated. The DSDS device (100) determines whether the flag is set in the DSDS device (100) in response to determining that the voice call of the first SIM (150a) is terminated. At operations 607a-608a, the DSDS device (100) triggers the event (i.e. mobility update procedure) on the second SIM (150b) when the page information is received at the second SIM (150b) from the server (200) during the voice call of the first SIM (150a), the flag is set at the DSDS device (100) and the voice call of the first SIM (150a) is terminated.

Referring to FIG. 6B, at operations 601b-602b, the first SIM (150a) is on the voice call and the second SIM (150b) is in the standby mode or say the second SIM (150b) reads the page information only. At operation 603b, the DSDS device (100) continuously monitors that if any page information (relates to the pending SMS or pending call or pending data at the server (200)) receives on the second SIM (150b) during the voice call of the first SIM (150a). At operation 604b, the DSDS device (100) identifies that the page information receives on the second SIM (150b) during the voice call of the first SIM (150a) and ignores the received page information as the second SIM (150b) is in the standby mode.

At operation 605b, the DSDS device (100) determines whether the voice call of the first SIM (150a) is terminated. The DSDS device (100) continuously monitors that if any page information receives on the second SIM (150b) during the voice call of the first SIM (150a) in response to determining that the voice call of the first SIM (150a) is not terminated. At operations 606b-607b, the DSDS device (100) triggers the event (i.e. mobility update procedure) on the second SIM (150b) when the page information is received or not received at the second SIM (150b) from the server (200) during the voice call of the first SIM (150a) and the voice call of the first SIM (150a) is terminated.

Figure 7A:
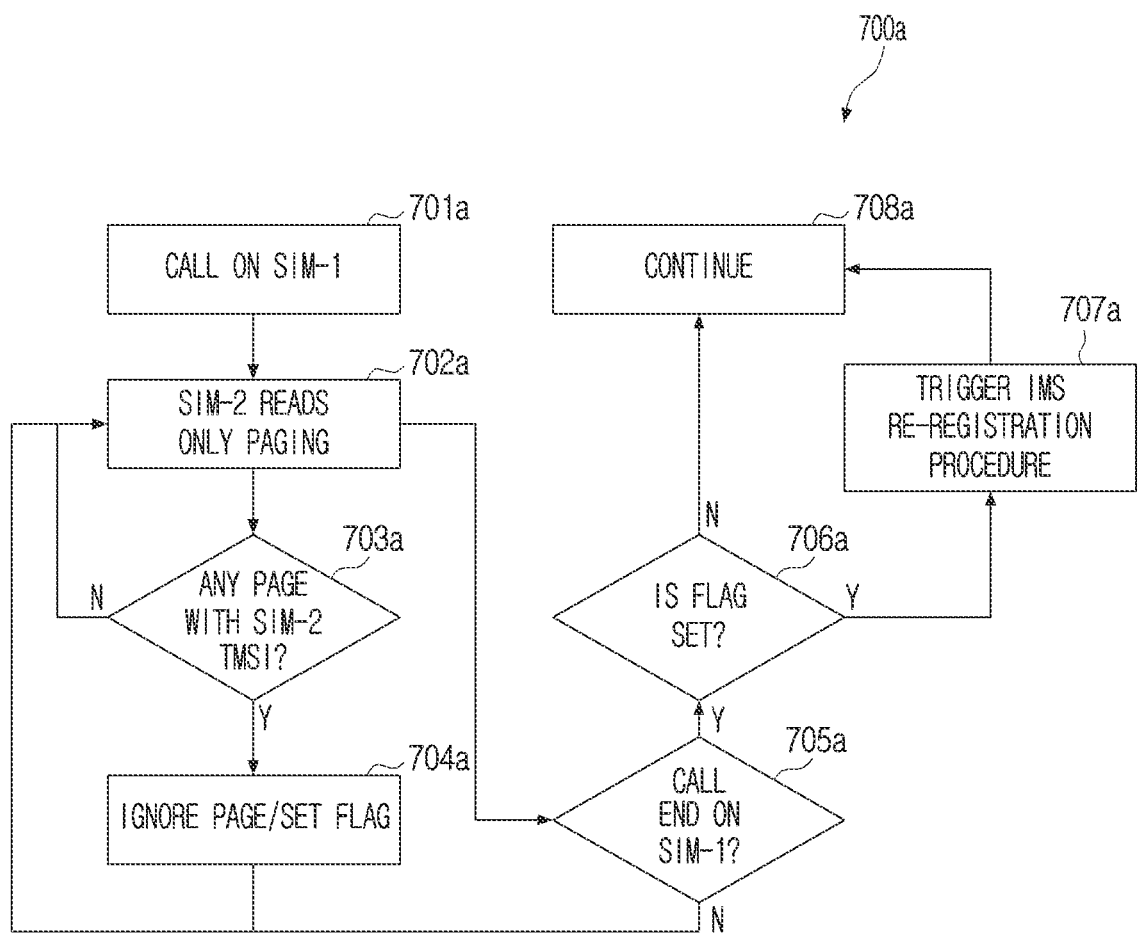
FIGS. 7A and 7B illustrate flow diagrams for controlling the SMS communication to avoid/reduce SMS delivery delays in the wireless communication network by triggering an IMS re-registration procedure, according to various embodiments of the disclosure.
Figure 7B:
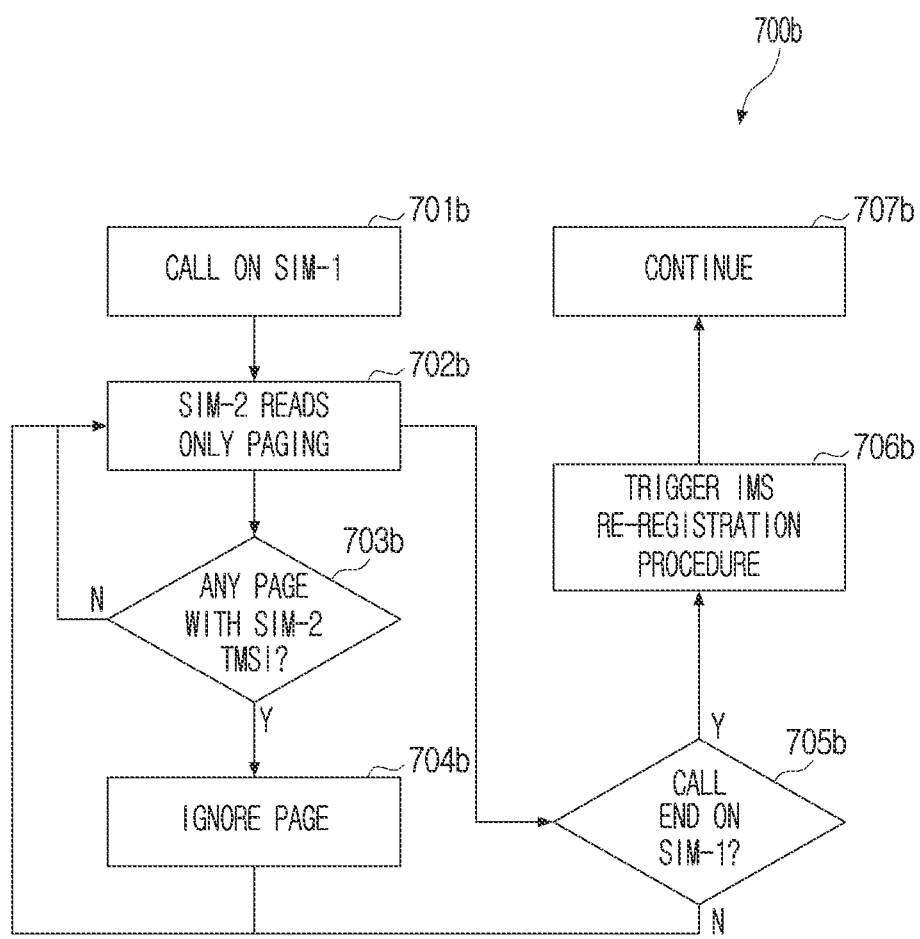

FIGS. 7A and 7B illustrate flow diagrams (700a and 700b) for controlling the SMS communication to avoid/reduce the SMS delivery delays in the wireless communication network by triggering an IMS re-registration procedure, according to various embodiments of the disclosure.

Referring to FIG. 7A, at operations 701a-702a, the first SIM (150a) is on the voice call and the second SIM (150b) is in the standby mode or say the second SIM (150b) reads the page information only. At operation 703a, the DSDS device (100) continuously monitors that if any page information (relates to the pending SMS or pending call or pending data at the server (200)) receives on the second SIM (150b) during the voice call of the first SIM (150a). At operation 704a, the DSDS device (100) identifies that the page information receives on the second SIM (150b) during the voice call of the first SIM (150a), ignoring the received page information as the second SIM (150b) is in the standby mode, and setting the flag in the DSDS device (100) when any page information receives on the second SIM (150b) during the voice call of the first SIM (150a).

At operations 705a-706a, the DSDS device (100) determines whether the voice call of the first SIM (150a) is terminated. The DSDS device (100) continuously monitors that if any page information receives on the second SIM (150b) during the voice call of the first SIM (150a) in response to determining that the voice call of the first SIM (150a) is not terminated. The DSDS device (100) determines whether the flag is set in the DSDS device (100) in response to determining that the voice call of the first SIM (150a) is terminated. At operations 707a-708a, the DSDS device (100) triggers the event (i.e. IMS re-register procedure) on the second SIM (150b) when the page information is received at the second SIM (150b) from the server (200) during the voice call of the first SIM (150a), the flag is set at the DSDS device (100) and the voice call of the first SIM (150a) is terminated.

Referring to FIG. 7B, at operations 701b-702b, the first SIM (150a) is on the voice call and the second SIM (150b) is in the standby mode or say the second SIM (150b) reads the page information only. At operation 703b, the DSDS device (100) continuously monitors that if any page information (relates to the pending SMS or pending call or pending data at the server (200)) receives on the second SIM (150b) during the voice call of the first SIM (150a). At operation 704b, the DSDS device (100) identifies that the page information receives on the second SIM (150b) during the voice call of the first SIM (150a) and ignores the received page information as the second SIM (150b) is in the standby mode.

At operation 705b, the DSDS device (100) determines whether the voice call of the first SIM (150a) is terminated. The DSDS device (100) continuously monitoring that if any page information receives on the second SIM (150b) during the voice call of the first SIM (150a) in response to determining that the voice call of the first SIM (150a) is not terminated. At operations 706b-707b, the DSDS device (100) triggers the event (i.e. mobility update procedure) on the second SIM (150b) when the page information is received or not received at the second SIM (150b) from the server (200) during the voice call of the first SIM (150a) and the voice call of the first SIM (150a) is terminated.

Figure 8:
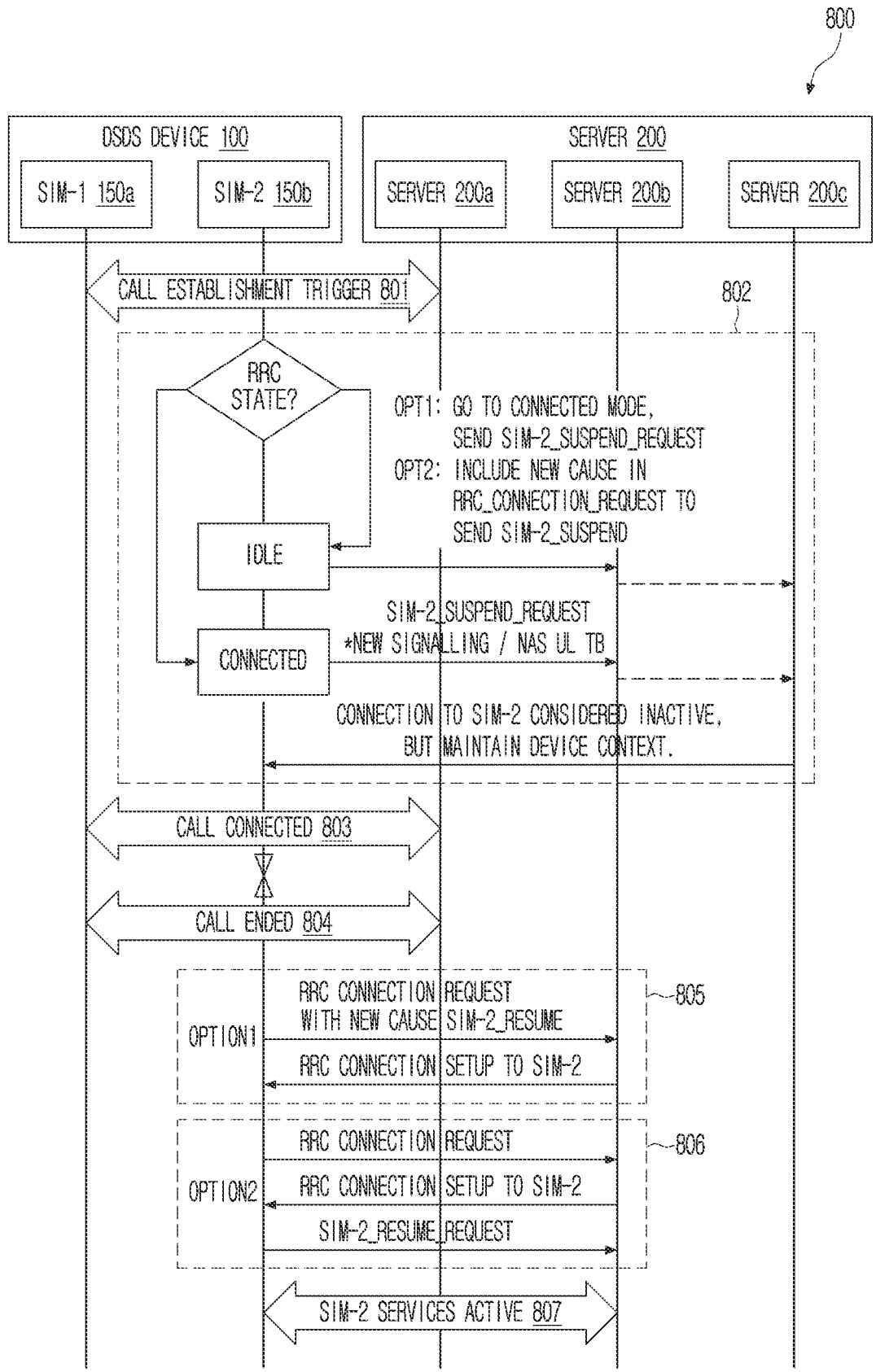
FIG. 8 is another example sequence diagram illustrating the method for controlling the SMS communication to avoid/reduce SMS delivery delays in the wireless communication network, according to an embodiment of the disclosure.

FIG. 8 is another example sequence diagram (800) illustrating the method for controlling the SMS communication to avoid/reduce the SMS delivery delays in the wireless communication network, according to an embodiment of the disclosure.

In general, when the first SIM (150a) is on the voice call and at the same time other voice call/SMS service triggers towards the second SIM (150b) then one solution from the 3GPP standards to avoid such behavior is to send, by existing DSDS device, at least two messages to the server to avoid synchronization problem. Example of the at least two messages is a registration request and a registration accept or a TAU request and a TAU accept.

In an embodiment, the proposed method provides a single message solution (e.g. suspend/resume services on the second SIM (150b)) to corresponding server, when the first SIM (150a) is on the voice call and at the same time other voice call/SMS service triggers towards the second SIM (150b).

Referring to FIG. 8, at operation 801, the method includes triggering the voice call on the first SIM (150a). At operation 802, the DSDS device (100) check the status of the second SIM (150b) before establishing the voice call on the first SIM (150a). If the second SIM (150b) is in an RRC connected state, then the second SIM (150b) sends a suspend message to the server (200b) and a server (200c) (i.e. Core Network (CN)). The suspend message sends by a new signaling message or a Non-access stratum (NAS) uplink data block. If the second SIM (150b) is in an RRC idle state, then the second SIM (150b) goes to the RRC connected state and sends the suspend message to the server (200b) and a server (200c) or Include a new cause in an RRC connection request to suspend the second SIM (150b) (the DSDS device (100) does not wait for a response and puts the second SIM (150b) into a sleep/suspend state). While the second SIM (150b) is in the suspend state, the connection shall be released from the server (200), but context shall be maintained by the server (200) (e.g. eNB/gNB and MME/AMF/ other entities).

At operation 803, the method includes connecting the voice call for the first SIM (150a), then doing basic operation as mentioned earlier and the 3GPP standards. At operation 804, the method includes identifying that the voice call of the first SIM (150a) is terminated. At operations 805, 806, and 807, the method includes two options. In the first option, going to the connected mode for the second SIM (150b) and sending a resume message for the second SIM (150b) to the server (200). In the second option, includes a new cause in the RRC connection request to resume services for the second SIM (150b) (the server (200) responds with an RRC setup).

The various actions, acts, blocks, operations, or the like in the flow/sequence diagrams (300, 400, 500a, 500b, 600a, 600b, 700a, 700b, and 800) may be performed in the order presented, in a different order or simultaneously. Further, in some embodiments, some of the actions, acts, blocks, operations, or the like may be omitted, added, modified, skipped, or the like without departing from the scope of the disclosure.

In an embodiment, all mentioned above embodiments are also applicable for the multi-SIM device or say a User Equipment (UE) with more than two SIMs. Furthermore, all mentioned above embodiments are also applicable for pending voice calls, pending data, etc.

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling a Short Message Service (SMS) communication in a wireless communication network by a Dual Subscriber Identity Module (SIM) Dual Standby (DSDS) device having a first SIM and a second SIM, the method comprising:
  detecting, by the DSDS device, that the first SIM is on a voice call and the second SIM is in a standby mode;
  determining, by the DSDS device, whether page information is received at the second SIM from a server during the voice call of the first SIM, the page information indicating that a pending SMS is available at the server;
  determining, by the DSDS device, whether the voice call of the first SIM is terminated; and
  performing, by the DSDS device, one of:
    immediately sending a refresh registration signal to the server in response to determining that the page information is received at the second SIM from the server during the voice call of the first SIM and the voice call of the first SIM is terminated, or
    immediately sending the refresh registration signal to the server in response to determining that the voice call of the first SIM is terminated and immediately receiving, by the DSDS device, the pending SMS from the server in response to sending the refresh registration signal to the server.

2. The method as claimed in claim 1, further comprising:
  sending, by the server, the page information to the second SIM during the voice call;
  determining, by the server, whether an acknowledgement of the page information is received from the second SIM;
  initiating, by the server, a Short Message Service Center (SMSC) timer in response to determining that the acknowledgement of the page information is not received from the second SIM;
  determining, by the server, whether the refresh registration signal is received from the second SIM;
  terminating, by the server, the SMSC timer in response to determining that the refresh registration signal is received from the second SIM; and
  immediately sending, by the server, the pending SMS to the second SIM associated with the page information.

3. The method as claimed in claim 1, wherein the server provides a service of Internet Protocol (IP) Multimedia Subsystem (IMS) and a service of Short Message Service Center (SMSC).

4. The method as claimed in claim 1, wherein the refresh registration signal indicates to stop an SMSC timer at the server.

5. The method as claimed in claim 1,
wherein the refresh registration signal comprises a reason header value, and
wherein the reason header value comprises at least one of a DSDS service ready, a DSDS service resume, or a mutually agreed key string.

6. A method for controlling Short Message Service (SMS) communication by a server in a wireless communication network, the method comprising:
detecting, by the server, that a first Subscriber Identity Module (SIM) of a Dual SIM Dual Standby (DSDS) device is on a voice call and a second SIM is in a standby mode;
sending, by the server, page information to the second SIM during the voice call of the first SIM, the page information indicating that a pending SMS is available at the server;
determining, by the server, whether an acknowledgement of the page information is received from the second SIM;
initiating, by the server, a Short Message Service Center (SMSC) timer in response to determining that the acknowledgement of the page information is not received from the second SIM;
determining, by the server, whether a refresh registration signal is received from the second SIM;
terminating, by the server, the SMSC timer in response to determining that the refresh registration signal is received from the second SIM; and
immediately sending, by the server, the pending SMS to the second SIM associated with the page information.

7. A method for controlling a Short Message Service (SMS) communication in a wireless communication network by a Dual Subscriber Identity Module (SIM) Dual Standby (DSDS) device having a first SIM and a second SIM, the method comprising:
detecting, by the DSDS device, that the first SIM is on a voice call and the second SIM is in a standby mode;
determining, by the DSDS device, whether page information is received at the second SIM from a server during the voice call of the first SIM and a flag is set at the DSDS device, the page information indicating that a pending SMS is available at the server, and the flag being set to indicate that the page information is received at the second SIM from the server during the voice call of the first SIM;
determining, by the DSDS device, whether the voice call of the first SIM is terminated; and
performing, by the DSDS device, one of:
triggering an event on the second SIM in response to determining that the page information is received at the second SIM from the server during the voice call of the first SIM, the flag is set at the DSDS device and the voice call of the first SIM is terminated, or
triggering the event on the second SIM in response to determining that the voice call of the first SIM is terminated and immediately receiving, by the DSDS device, the pending SMS from the server in response to triggering the event.

8. The method as claimed in claim 7, wherein the event comprises one of an IP Multimedia Subsystem (IMS) re-register procedure, a mobility update procedure, and a refresh IMS subscribe procedure.

9. The method as claimed in claim 7, further comprising:
determining, by the DSDS device, whether the second SIM is in a connected mode or a standby mode before establishing the voice call on the first SIM;
performing, by the DSDS device, one of:
sending a suspend message to the server in response to determining that the second SIM is in the connected mode before establishing the voice call on the first SIM, or
sending the suspend message to the server by entering to the connected mode in response to determining that the second SIM is in the standby mode before establishing the voice call on the first SIM;
detecting, by the DSDS device, that the voice call of the first SIM is terminated;
determining, by the DSDS device, whether the second SIM is in the connected mode or the standby mode when the voice call of the first SIM is terminated; and
performing, by the DSDS device, one of:
sending a resume message to the server in response to determining that the second SIM is in the connected mode, or
sending the resume message to the server by entering into the connected mode in response to determining that the second SIM is in the standby mode.

10. The method as claimed in claim 9, wherein the suspend message indicates to maintain context information at the server.

11. A Dual Subscriber Identity Module (SIM) Dual Standby (DSDS) device having a first SIM and a second SIM for controlling Short Message Service (SMS) communication in a wireless communication network, the DSDS device comprising:
memory;
a processor;
a SIM; and
a DSDS service controller, operably connected to the memory and the processor, configured to:
detect that the first SIM is on a voice call and the second SIM is in a standby mode,
determine whether page information is received at the second SIM from a server during the voice call of the first SIM, wherein the page information indicates that a pending SMS is available at the server,
determine whether the voice call of the first SIM is terminated, and
perform one of:
immediately sending a refresh registration signal to the server in response to determining that the page information is received at the second SIM from the server during the voice call of the first SIM and the voice call of the first SIM is terminated, or
immediately sending the refresh registration signal to the server in response to determining that the voice call of the first SIM is terminated and immediately receiving the pending SMS from the server in response to sending the refresh registration signal to the server.

12. The DSDS device as claimed in claim 11, wherein the server provides a service of IP Multimedia Subsystem (IMS) and a service of Short Message Service Center (SMSC).

13. The DSDS device as claimed in claim 11, wherein the refresh registration signal indicates to stop an SMSC timer at the server.

14. The DSDS device as claimed in claim 11,
wherein the refresh registration signal comprises a reason header value, and
wherein the reason header value comprises at least one of a DSDS service ready, a DSDS service resume, or a mutually agreed key string.

15. A server for controlling Short Message Service (SMS) communication in a wireless communication network, the server comprising:
memory;
a processor; and
a DSDS service controller, operably connected to the memory and the processor, configured to:
detect that a first Subscriber Identity Module (SIM) of a Dual SIM Dual Standby (DSDS) device is on a voice call and a second SIM is in a standby mode,
send page information to the second SIM during the voice call of the first SIM, wherein the page information indicates that a pending SMS is available at the server,
determine whether an acknowledgement of the page information is received from the second SIM,
initiate a Short Message Service Center (SMSC) timer in response to determining that the acknowledgement of the page information is not received from the second SIM,
determine whether a refresh registration signal is received from the second SIM,
terminate the SMSC timer in response to determining that the refresh registration signal is received from the second SIM, and
immediately send the pending SMS to the second SIM associated with the page information.

16. A Dual Subscriber Identity Module (SIM) Dual Standby (DSDS) device having a first SIM and a second SIM for controlling Short Message Service (SMS) communication in a wireless communication network, the DSDS device comprising:
memory;
a processor;
a SIM; and
a DSDS service controller, operably connected to the memory and the processor, configured to:
detect that the first SIM is on a voice call and the second SIM is in a standby mode,
determine whether page information is received at the second SIM from a server during the voice call of the first SIM and a flag is set at the DSDS device, the page information indicating that a pending SMS is available at the server, and the flag being set to indicate that the page information is received at the second SIM from the server during the voice call of the first SIM,
determine whether the voice call of the first SIM is terminated, and
perform one of:
trigger an event on the second SIM in response to determining that the page information is received at the second SIM from the server during the voice call of the first SIM, and that the flag is set at the DSDS device and the voice call of the first SIM is terminated, or
trigger the event on the second SIM in response to determining that the voice call of the first SIM is terminated and immediately receive the pending SMS from the server in response to triggering the event.

17. The DSDS device as claimed in claim 16, wherein the event comprises one of an IP Multimedia Subsystem (IMS) re-register procedure, a mobility update procedure, and a refresh IMS subscribe procedure.

18. The DSDS device as claimed in claim 16, wherein the DSDS service controller is further configured to:
determine whether the second SIM is in a connected mode or a standby mode before establishing the voice call on the first SIM;
perform one of:
sending a suspend message to the server in response to determining that the second SIM is in the connected mode before establishing the voice call on the first SIM, or
sending the suspend message to the server by entering to the connected mode in response to determining that the second SIM is in the standby mode before establishing the voice call on the first SIM;
detect that the voice call of the first SIM is terminated;
determine whether the second SIM is in the connected mode or the standby mode when the voice call of the first SIM terminated; and
perform one of:
sending a resume message to the server in response to determining that the second SIM is in the connected mode, or
sending the resume message to the server by entering into the connected mode in response to determining that the second SIM is in the standby mode.

19. The DSDS device as claimed in claim 18, wherein the suspend message indicates to maintain context information at the server.

20. The DSDS device as claimed in claim 19, wherein the context information includes at least security context information and a temporary mobile subscriber identity (TMSI) shared during an attach process.

* * * * *